Feb. 13, 1945.  G. R. STIBITZ  2,369,619

RELAY TESTING SYSTEM

Filed May 7, 1942

INVENTOR
G. R. STIBITZ
BY
P. C. Smith
ATTORNEY

Patented Feb. 13, 1945

2,369,619

UNITED STATES PATENT OFFICE 2,369,619

RELAY TESTING SYSTEM

George R. Stibitz, Boonton, N. J., assignor to Bell Telephone Laboratories, Incorporated, New York, N. Y., a corporation of New York Application May 7, 1942, Serial No. 442,120

4 Claims. (Cl. 175—183)

This invention relates to testing arrangements and has for its object to test the operating time of relays, more especially multicontact relays.

It is very often of importance that a relay operate within a minimum time interval. Likewise in the case of relays which simultaneously close a large number of circuits it is desirable that the closure of none of the circuits be delayed unduly.

In accordance with the present invention means is provided for determining that the time elapsing between the energization of a relay winding and the closure of its contact does not exceed a measured minimum time interval together with means for adjusting the time interval.

The invention also contemplates the simultaneous testing of a plurality of relay contacts with means for determining which contacts, if any, are unduly slow in closing.

Figure 1:
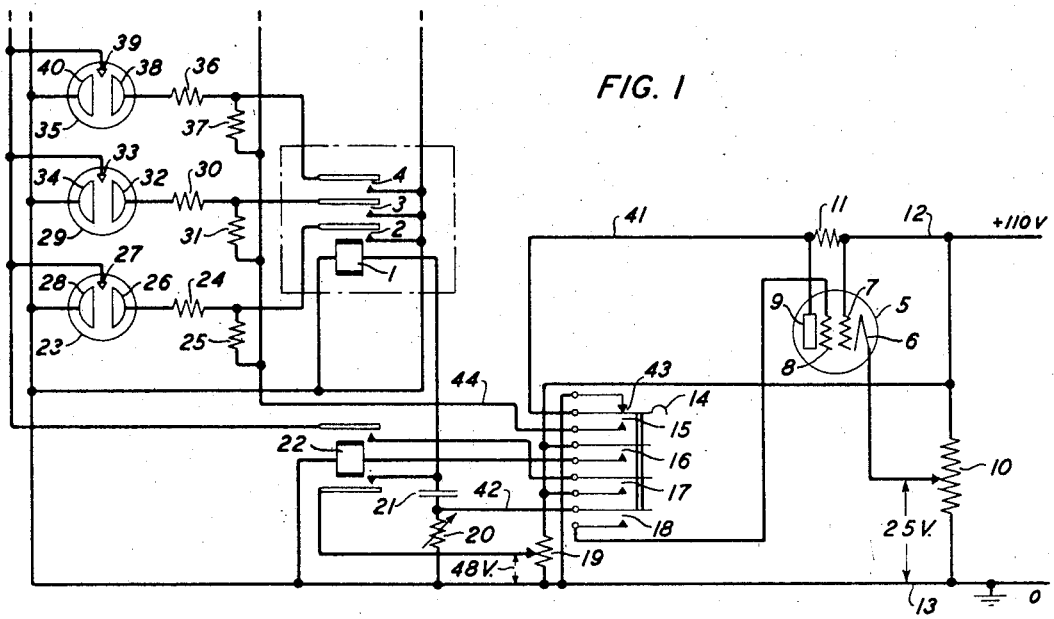
Figure 2:
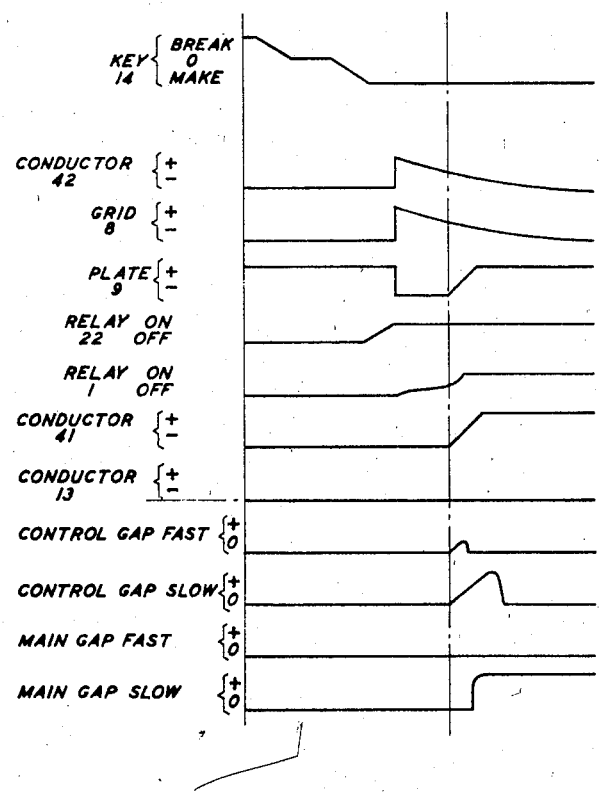

The invention will be more clearly understood from a consideration of the following description in connection with the drawing, in which Fig. 1 shows a circuit diagram of the testing means and Fig. 2 shows a time scale for the elements of the circuit of Fig. 1.

Briefly the testing circuit of the present invention includes means for simultaneously energizing the winding of the relay to be tested and starting the measurement of a time interval. Each contact of the relay is connected to the control electrode of an individual gas-filled tube to which a breakdown potential is applied at the end of the measured time. Those contacts which close promptly render this potential ineffective, while contacts which close slowly have no effect on the tubes which have been rendered conducting.

In Fig. 1, relay 1 is the relay to be tested. This relay is shown with three contacts, 2, 3 and 4, but it will be apparent that the testing arrangement is applicable to relays having any number of contacts.

The testing circuit employs a source of potential of 110 volts having the negative terminal grounded and connected to conductor 13 while the positive 110-volt terminal is connected to conductor 12. Between conductors 12 and 13 are connected potentiometers 10 and 19 to provide other voltages.

Key 14 prepares certain of the testing circuits while relay 22, operated by means of key 14 is the means for starting the test.

Relay 1 is connected between grounded conductor 13 and the lower front contact of relay 22. Also between grounded conductor 13 and the lower front contact of relay 22 is connected condenser 21 in series with adjustable high resistance 20. The other side of the lower front contact of relay 22 is connected to the contact of potentiometer 19 which has been adjusted to provide a potential of 48 volts which is the normal operating potential for relays in telephone circuits.

When key 14 is operated, contact 16 connects relay 22 between conductors 12 and 13 so that relay 22 operates at once. At its lower contact, relay 22 connects the 48-volt potential from potentiometer 19 to relay 1 to operate that relay, and simultaneously therewith closes a charging circuit for condenser 21 through resistance 20 in order to measure the time for operation of relay 1.

In order to detect whether any one of the contacts of relay 1 fails to close within the time measured by the charging of condenser 21, the gas-filled tubes 23, 29, 35 etc. are provided. The cathodes 28, 34, 40, etc. of the tubes 23, 29, 35, etc. are permanently connected to grounded conductor 13. Relay 22 in operating connects the anodes 27, 33, 39 of the tubes over contact 17 of key 14 to 110 volts on conductor 12. The control cathode 26 of tube 23 is connected through resistance 24 to one side of contact 2 of relay 1. Similarly control cathode 32 of tube 29 is connected through resistance 30 to contact 3 and control cathode 38 of tube 35 is connected through resistance 36 to contact 4.

The same sides of contacts 2, 3 and 4 are connected to resistances 25, 31 and 37 respectively, resistances 25, 31 and 37 being connected in parallel to conductor 44. The other sides of contacts 2, 3 and 4 are connected in parallel to grounded conductor 13.

In order to apply breakdown potential to conductor 41, vacuum tube 5 is employed. Tube 5 has a filament 6, heated by auxiliary means (not shown), a plate 9 and two grids 7 and 8. Plate 9 is connected to conductor 12 through resistance 11, while filament 6 is connected to conductor 13 through a part of potentiometer 10. The filament 6 and grid 7 are connected across the remainder of potentiometer 10.

With key 14 normal, the plate 9 is connected over contact 43 to conductor 13 to hold tube 5 inoperative. When key 14 is operated plate 9 is disconnected from conductor 13 and connected over contact 15 of key 14 to conductor 44.

At contact 18 of key 14, conductor 42 which is connected to the point between condenser 21 and resistance 20, is extended to grid 8 of tube 5. At the moment this circuit is closed, conductor 42 receives a potential of approximately 48 volts. As the condenser 21 charges, the potential on conductor 42 and grid 8 falls to zero. When this potential reaches zero tube 5 becomes non-conducting.

It will be apparent from the foregoing that the control gaps of tubes 23, 29 and 35 are connected in parallel across the output of tube 5 by the closure of key 14. As long as tube 5 is conducting, the potential across these control gaps is insufficient to cause the tubes to strike. However, when, after the time interval measured by the charging of condenser 21, tube 5 becomes non-conducting, the potential across the control gaps of the gas-filled tubes rises to a point where the tubes are able to strike. However, if the contacts of relay 1 close before the end of the measured interval, ground over the closed relay contacts reduces the potential on the control cathodes below the striking voltage and the gas-filled tubes remain non-conducting. If any one of the tubes 23, 29, 35, etc. does break down, the current flow in the main gap is independent of the control cathode and the subsequent closure of the relay contact cannot quench the tube.

By observing which tubes have been operated, slow contacts may be detected. Opening key 14 extinguishes any operated tubes and the relay contacts may be adjusted and retested by re-operating key 14.

Fig. 2 is illustrative of the time elements of the circuit of Fig. 1. From this it will appear that the sequence of events is started by the operation of key 14, followed by the operation of relay 22, at which time the potential on conductor 42 and grid 8 becomes a maximum with respect to filament 6 and the plate 9 passes from the open circuit condition to the conducting condition. Relay 1, then operates, followed by the breakdown of the gas-filled tube if the relay contact is slow enough to permit the control voltage to build up to the striking point.

What is claimed is:

1. Testing means for testing a relay having a winding and a plurality of pairs of relatively movable contacts, comprising a source of potential, a plurality of gas-filled tubes, each tube having a pair of main electrodes and a control electrode, means to connect the control electrodes of said tubes respectively to one of each pair of said contacts, the other of each pair of said contacts being connected to ground, timing means, means to simultaneously energize said relay winding, start the operation of said timing means and prepare a circuit extending from said source of potential to the main electrodes of said tubes in parallel, and means responsive to the completion of the operation of said timing means to apply a breakdown potential to said control electrodes in parallel for the purpose of causing said tubes to flash, the closure of correctly adjusted pairs of said relay contacts serving to connect ground to the connected ones of said control electrodes to prevent the connected ones of said tubes from flashing, said unflashed tubes identifying said correctly adjusted contact pairs.

2. A testing device for testing the operating time of a relay having a winding and a pair of relatively movable contacts, comprising a gas-filled tube having a main gap and a control gap, a direct current source having a potential above the breakdown potential of said control gap, a vacuum tube having an output circuit, said output circuit connected to said direct current source, circuits connecting said relay contacts and said control gap in parallel with said output circuit, means to render said vacuum tube conducting to reduce the potential applied to said relay contacts and said control gap below said breakdown potential, timing means, means simultaneously effective to energize said winding, to prepare a circuit including said main gap and said direct current source and to start the operation of said timing means, and means responsive to the completion of the operation of said timing means to render said vacuum tube non-conducting to restore the potential applied to said control gap to its breakdown value and to operate said gas-filled tube if said relay contacts are still open, the flashing of said tube indicating a defective contact pair.

3. Testing means for testing a relay having a winding and a plurality of pairs of relatively movable contacts, comprising a source of potential a plurality of gas-filled tubes, each tube having a pair of main electrodes and a control electrode, means to connect the control electrodes of said tubes individually to one of each pair of said contacts, the other of each pair of said contacts being connected to ground, a condenser, a charging circuit for said condenser, means to simultaneously energize said relay winding, prepare a circuit extending from said source of potential to the main electrodes of said tubes in parallel and close said charging circuit, a source of breakdown potential, and means responsive to a predetermined charge on said condenser to apply said breakdown potential to said control electrodes in parallel for the purpose of causing said tubes to flash, the closure of correctly adjusted pairs of said contacts serving to connect ground to the connected ones of said control electrodes to prevent the connected ones of said tubes from flashing, the tubes which flash indicating defectively adjusted pairs of contacts.

4. A testing device for testing the operating time of a relay having a winding and a pair of relatively movable contacts, comprising a gas-filled tube having a main gap and a control gap, said control gap connected across said pair of relay contacts, a source of potential normally exceeding the breakdown potential of said control gap, a vacuum tube having an output circuit connected to said source of potential and a control grid, a circuit for connecting said output circuit across the control gap of said gas-filled tube, means to render said vacuum tube conducting to reduce the potential across said output circuit below the breakdown potential of said control gap, a condenser connected with said control grid, a charging circuit for said condenser, means for simultaneously energizing said relay winding, preparing a circuit extending from said source of potential to said main gap and closing said charging circuit, the charge on said condenser becoming effective after a predetermined time interval to apply a blocking potential to said control grid to render said vacuum tube non-conducting in order to restore said output potential to the breakdown potential of said control gap and to operate said gas-fillled tube if said relay contact fails to close within said time interval, and means responsive to the closure of said relay contact prior to the completion of said timing operation to prevent the potential on said output circuit reaching said breakdown potential.

GEORGE R. STIBITZ.